United States Patent
Shindo et al.

(10) Patent No.: US 10,484,970 B2
(45) Date of Patent: *Nov. 19, 2019

(54) MOBILE COMMUNICATION SYSTEM, CONTROL STATION, BASE STATION, COMMUNICATION METHOD AND PROGRAM

(71) Applicant: NEC CORPORATION, Tokyo (JP)

(72) Inventors: Masato Shindo, Minato-ku (JP); Sadafuku Hayashi, Minato-ku (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/889,653

(22) Filed: Feb. 6, 2018

(65) Prior Publication Data

US 2018/0167909 A1 Jun. 14, 2018

Related U.S. Application Data

(63) Continuation of application No. 15/279,168, filed on Sep. 28, 2016, now Pat. No. 9,936,481, which is a
(Continued)

(30) Foreign Application Priority Data

Oct. 31, 2008 (JP) .................................. 2008-281096

(51) Int. Cl.
*H04W 72/00* (2009.01)
*H04W 4/06* (2009.01)
(Continued)

(52) U.S. Cl.
CPC .......... *H04W 72/005* (2013.01); *H04W 4/06* (2013.01); *H04W 76/40* (2018.02); *H04L 12/189* (2013.01);
(Continued)

(58) Field of Classification Search
CPC ...... H04W 72/005; H04W 76/40; H04W 4/06
See application file for complete search history.

(56) References Cited

U.S. PATENT DOCUMENTS 7,539,493 B2 5/2009 Kwak et al.
7,860,107 B2 12/2010 Legg
(Continued)

FOREIGN PATENT DOCUMENTS

CN 10105142 A 8/2007
CN 101043729 A 9/2007
(Continued)

OTHER PUBLICATIONS

"3rd Generation Partnership Project: Technical Specification Group Radio Access Network; Introduction of the Multimedia Broadcast Multicast Service (MBMS) in the Radio Access Network (RAN); Stage 2 (Release 8)", 3GPP TS 25.346, V8.1.0 Mar. 2008.
(Continued)

*Primary Examiner* — Gary Mui
(74) *Attorney, Agent, or Firm* — Sughrue Mion, PLLC

(57) ABSTRACT

A mobile communication system according to the present invention is a mobile communication system including base stations each of which forms a cell and transmits MBMS data to a mobile station existing in the cell, and control stations each of which controls the base station connected thereto, wherein the control stations include at least a control station and a second control station that determines a frequency and timing for transmitting the MBMS data in the cell and instructs the first control station of the determined frequency and timing, and wherein each of the first and second control stations establishes time synchronization with another control station and instructs the connected base station to set the cell to the frequency determined by the second control station and transmits the MBMS data to the
(Continued)

connected base station in accordance with the transmission timing determined by the second control station.

9 Claims, 13 Drawing Sheets

Related U.S. Application Data continuation of application No. 13/122,786, filed as application No. PCT/JP2009/065705 on Sep. 9, 2009, now Pat. No. 9,497,731.

(51) Int. Cl.
| | |
|---|---|
| *H04W 76/40* | (2018.01) |
| *H04L 12/18* | (2006.01) |
| *H04W 28/16* | (2009.01) |
| *H04W 88/12* | (2009.01) |
| *H04W 92/20* | (2009.01) |

(52) U.S. Cl.
CPC ............ *H04W 28/16* (2013.01); *H04W 88/12* (2013.01); *H04W 92/20* (2013.01)

(56) References Cited

U.S. PATENT DOCUMENTS

| | | |
|---|---|---|
| 7,894,338 B2 | 2/2011 | Ljung et al. |
| 8,050,221 B2 | 11/2011 | Jeong et al. |
| 8,135,043 B2 | 3/2012 | Ogura |
| 8,249,007 B2 | 8/2012 | Jading et al. |
| 8,532,683 B2 | 9/2013 | Koskinen et al. |
| 2004/0103435 A1 | 5/2004 | Yi et al. |
| 2006/0252430 A1 | 11/2006 | Barreto et al. |
| 2008/0167041 A1 | 7/2008 | Wang et al. |
| 2008/0205322 A1 | 8/2008 | Cai et al. |
| 2008/0293419 A1 | 11/2008 | Somasundaram et al. |
| 2009/0156225 A1 | 6/2009 | Angelow et al. |
| 2009/0201884 A1 | 8/2009 | Chaponniere |
| 2010/0110958 A1 | 5/2010 | Racz et al. |
| 2010/0232340 A1 | 9/2010 | Godor et al. |
| 2010/0248708 A1 | 9/2010 | Koivisto et al. |
| 2010/0329150 A1 | 12/2010 | Nielsen |
| 2011/0032858 A1 | 2/2011 | Lohmar et al. |
| 2011/0044225 A1 | 2/2011 | RInne et al. |
| 2012/0014264 A1 | 1/2012 | Wang |

FOREIGN PATENT DOCUMENTS

| | | |
|---|---|---|
| CN | 101258697 A | 9/2008 |
| JP | 2004-135292 A | 4/2004 |
| JP | 2005-524333 A | 8/2005 |
| JP | 2005-530463 A | 10/2005 |
| JP | 2007-110766 A | 4/2007 |
| JP | 2008/053686 A | 5/2008 |
| JP | 2008136151 A | 6/2008 |
| JP | 2008-245060 A | 10/2008 |
| WO | 2004/028174 A1 | 4/2004 |
| WO | 2008/118064 A2 | 10/2008 |

OTHER PUBLICATIONS

3rd Generation Partnership Project; Technical Specification Group Core Network and Terminals; General Packet Radio Service (GPRS); GPRS Tunnelling Protocol (GTP) across the Gn and Gp interface (Release 8); 3GPP TS 29.060 v8.5.0, Sep. 2008, pp. 123-124.
"3rd Generation Partnership Project; Technical Specification Group Core Network and Terminals; Mobile Radio Interface Layer 3 Specification; Core Network Protocols; Stage 3 (Release 8)"; 3GPP TS 24.008 V8.3.0, Sep. 2008, pp. 487.
3rd Generation Partnership Project; Technical Specification Group Radio Access Network; Improvement of the Multimedia Broadcast Multicast Service (MBMS) in UTRAN (Release 7); 3GPP TR 25.905 V7.2.0, Dec. 2007, pp. 43.
"3rd Generation Partnership Project; Technical Specification Group Radio Access Network; Synchronisation in UTRAN Stage 2 (Release 7)", 3GPP TS 25.402 V7.6.0, Sep. 2008.
"3rd Generation Partnership Project; Technical Specification Group Radio Access Network; UTRAN Iu Interface RANAP Signalling (Release 8)", 3GPP TS 25.413 V8.0.1, Sep. 2008.
"3rd Generation Partnership Project; Technical Specification Group Services and System Aspects; Multimedia Broadcast/Multicast Service (MBMS); Architecture and Functional Description (Release 7)"; 3GPP TS 23.246 V7.4.0, Sep. 2007.
3rd Generation Partnership Project: Technical Specification Group Radio Access Network; "Control plane procedure for MBMS over Node B+", Meeting #59bis, Shenzhen, China; 3GPP TSG-RAN WG3; R3-080940, Apr. 3, 2008.
Communication dated Jun. 26, 2015 from the European Patent Office in counterpart European Application No. 09823415.6.
Communication dated Sep. 30, 2014, from the Japanese Patent Office in counterpart Japanese Application No. 2014029394.
Korean Office Action dated Jun. 21, 2012 issued by the Korean Intellectual Property Office in counterpart Korean Application No. 10-2011-7010991.
Nokia et al: "Introduction of MBMS Improved Solution", 3GPP TSG-RAN WG3 Meeting #61bis; R3-082643, Sep. 2008.
Nokia Siemens Networks et al: "Stage-2 CR for MBMS Control Plane procedures for inter-RNC combining scenarios", 3GPP TSG-RAN WG3 Meeting #61bis; R3-082803, Oct. 2008.
Office Action issued by the Japanese Patent Office dated Apr. 26, 2016 in corresponding Application No. 2015-097350.
Office Action issued by the State Intellectual Property Office of the People's Republic of China dated Feb. 1, 2016 in corresponding Application No. 201310488554.6.
Office Action issued by the State Intellectual Property Office of the People's Republic of China dated May 22, 2013 in corresponding Application No. 200980143465.X.
Technical Specification Group Radio Access Network; "Summary of the continued discussion on L1 parameter handling in dedicated signalling", Meeting #62, Kansas City, USA; TSG-RAN WG2; R2-082125, May 5-9, 2008.

Figure 2

(a) When MBSFN is used

| Receiver | Receiver capable of equalizing 3 RLs | Receiver capable of equalizing 7 RLs |
|---|---|---|
| Type-2 | 1.536 Mbps | 2.624 Mbps |
| | 0.307 b/s/Hz | 0.525 b/s/Hz |
| Type-3 | 3.008 Mbps | 5.376 Mbps |
| | 0.602 b/s/Hz | 1.075 b/s/Hz |

(b) When MBSFN is not used

| Receiver | Receiver capable of soft combining 3 RLs |
|---|---|
| Rake | 1.152 Mbps |
| | 0.2304 b/s/Hz |
| Type-1 | 2.240 Mbps |
| | 0.448 b/s/Hz |
| Type-2 | 1.216 Mbps |
| | 0.2432 b/s/Hz |
| Type-3 | 2.368 Mbps |
| | 0.4736 b/s/Hz |

Figure 5

| Decision Flag | 1 |
|---|---|
| Destination of information | #2,#3 |

Figure 6

| MBSFN | Frequency | Scrambling Code | Channelisation Code | Slot Format | Tx |
|---|---|---|---|---|---|
| 0 | N/A | N/A | N/A | N/A | N/A |
| 1 | f1 | sc1 | cc1 | sf1 | TT1 |
| 2 | f2 | sc2 | cc2 | sf2 | TT2 |
| ... | ... | ... | ... | ... | ... |
| 127 | f15 | sc15 | cc15 | sf15 | TT10 |

Figure 9

```
<RAR> ::= < Diameter Header: 258, REQ, PXY >
         < Session-Id >
         { Origin-Host }
         { Origin-Realm }
         { Destination-Realm }
         { Destination-Host }
         { Auth-Application-Id }
         { Re-Auth-Request-Type }
         [ Called-Station-Id ]
         [ Framed-IP-Address ]
         [ Framed-IPv6-Prefix ]
         [ Framed-Interface-Id ]
                          [ MBMS-StartStop-Indication ]
                          [ MBMS-Service-Area ]
         [ MBMS-Required-QoS ]
                          [ MBMS-Session-Duration ]
                          [ MBMS-Service-Type ]
         [ MBMS-Counting-Information ]
                          [ MBMS-Session-Identity ]
         [ MBMS-Session-Repetition-number ]
                          [ TMGI ]
       * [ 3GPP-SGSN-Address ]          ; broadcast case only
       * [ 3GPP-SGSN-IPv6-Address ]     ; broadcast case only
         [ MBMS-2G-3G-Indicator ]
         [ MBMS-Time-To-Data-Transfer ]
         [ MBMS-User-Data-Mode-Indication ]
         [ MBMS-BMSC-SSM-IP-Address ]
         [ MBMS-BMSC-SSM-IPv6-Address ]
30 ~~~~~ [ MBSFN-Flag ]
         [ Origin-State-Id ]
       * [ Proxy-Info ]
       * [ Route-Record]
```

Figure 10

| Information element |
|---|
| Recovery |
| Tunnel Endpoint Identifier Control Plane |
| End User Address |
| Access Point Name |
| GGSN Address for Control Plane |
| Alternative GGSN Address for Control Plane |
| Quality of Service Profile |
| Common Flags |
| Temporary Mobile Group Identity (TMGI) |
| MBMS Session Duration |
| MBMS Service Area |
| MBMS Session Identifier |
| MBMS 2G/3G Indicator |
| MBMS Session Repetition Number |
| MBMS Time To Data Transfer |
| MBSFN-Flag |
| Private Extension |

Figure 11

| IE/Group Name |
|---|
| Message Type |
| TMGI |
| MBMS Session Identity |
| MBMS Bearer Service Type |
| Iu Signalling Connection Identifier |
| RAB parameters |
| PDP Type Information |
| MBMS Session Duration |
| MBMS Service Area |
| Frequency Layer Convergence Flag |
| RA List of Idle Mode UEs |
| Global CN-ID IE |
| MBMS Session Repetition Number |
| Time to MBMS Data Transfer |
| MBMS Counting Information |
| MBSFN Information |
|     MBSFN-Flag |

Figure 12

| Negotiation Flag | 1 |
|---|---|
| Destination of Negotiation | #2,#3 |

MOBILE COMMUNICATION SYSTEM, CONTROL STATION, BASE STATION, COMMUNICATION METHOD AND PROGRAM

CROSS REFERENCE TO RELATED APPLICATIONS

This is a continuation of U.S. application Ser. No. 15/279,168, filed Sep. 28, 2016, which is a continuation of application Ser. No. 13/122,786, filed Apr. 6, 2011, which is a National Stage of International Application No. PCT/JP2009/065705 filed on Sep. 9, 2009, which claims priority from Japanese Patent Application No. 2008-281096, filed on Oct. 31, 2008, the contents of all of which are incorporated herein by reference in their entirety.

TECHNICAL FIELD

The present invention relates to a mobile communication system, a control station, a base station, a communication method and a program.

BACKGROUND ART

3GPP (3rd Generation Partnership Projects) defines a service called "MBMS" (Multimedia Broadcast Multicast Service) (Non Patent Literature 1~7).

MBMS is a service that simultaneously transmits, by broadcasting or multicasting, multimedia data (hereinafter referred to as "MBMS data") such as video and music to a plurality of UEs (User Equipment: mobile station).

Furthermore, 3GPP defines a scheme called "MBSFN (Multicast Broadcast Single Frequency Network)" as the scheme for providing MBMS.

MBSFN is a scheme for transmitting the same MBMS data to UEs in a plurality of cells formed by a plurality of Nodes B (base stations) using the same frequency and at the same timing.

Thus, when viewed from UEs, a plurality of cells can be regarded as one large communication area. This communication area is called "MBSFN cluster" and the UEs can receive MBMS data with a large gain under the control of the MBSFN cluster.

The plurality of cells that form the MBSFN cluster use not only the same frequency but also the same scrambling code, channelisation code and slot format or the like. In the present specification, the frequency, scrambling code, channelisation code and slot format are generically called "radio resources." To be more specific, these radio resources are used for S-CCPCH (Secondary Common Control Physical Channel) which is a common physical channel used to wirelessly transmit MBMS data from a Node B to a UE in each cell.

FIG. 1 illustrates an example of configuration of a mobile communication system of W-CDMA (Wideband-Code Division Multiple Access) that provides MBMS using an MBSFN (Non Patent Literature 1).

As shown in FIG. 1, the related mobile communication system includes BM-SC (Broadcast Multicast-Service Center) 100, GGSN (Gateway GPRS Support Node, GPRS=General Packet Radio Service) 200, SGSN (Serving GPRS Support Node) 300, RNC (Radio Network Controller: control station) 400 and Node B (NB) 500.

FIG. 1 shows three RNCs 400-1~400-3 (#1~#3) as RNC 400.

Furthermore, though not shown in the figure, BM-SC 100, GGSN 200 and SGSN 300 are arranged in a CN (Core Network) and RNC 400 and Node B 500 are arranged in RAN (Radio Access Network) 450 which will be described later. RAN 450 generally has a configuration in which a plurality of Nodes B 500 are connected to one RNC 400.

BM-SC 100 is a node provided with a function of authenticating a user of UE 800 to which MBMS data is transmitted, a function of managing MBMS data and a function of scheduling distribution of MBMS data or the like. Details of these operations are defined in 3GPP and are commonly known, and therefore descriptions thereof will be omitted.

GGSN 200 is a gateway node provided with a function of transferring an IP (Internet Protocol) packet (message and MBMS data integrated into an IP packet) sent from BM-SC 100 to SGSN 300 and a function of transferring the IP packet sent from SGSN 300 to BM-SC 100 or the like. Since details of these operations are defined in 3GPP and are commonly known, descriptions thereof will be omitted.

SGSN 300 is a node provided with a function of routing/transferring an IP packet, a function of performing mobility management and session management that are necessary for mobile communication or the like. Since details of these operations are defined in 3GPP and commonly known, descriptions thereof will be omitted.

RNCs 400-1~400-3 are nodes provided with a function of controlling RAN 450. For example, RNCs 400-1~400-3 determine radio resources of S-CCPCH in cells 600 under their control, instruct Node B 500 to set the S-CCPCH, determine transmission timing for transmitting MBMS data in cell 600 under their control and transmit MBMS data to each Node B 500 in synchronization with the transmission timing. Since details of these operations are defined in 3GPP and are commonly known, descriptions thereof will be omitted. Assume that "under control" in the present specification refers to subordinate nodes connected to the own node, cells formed by the subordinate nodes, MBSFN clusters or the like.

Thus, RNCs 400-1~400-3 independently determine radio resources and transmission timing in cells 600 under their control.

Thus, MBSFN cluster 700-1 under the control of RNC 400-1, MBSFN cluster 700-2 under the control of RNC 400-2, and MBSFN cluster 700-3 under the control of RNC 400-3 are formed respectively.

Node B 500 is a node provided with a function of setting radio resources in an S-CCPCH based on instructions from RNCs 400-1~400-3 and a function of converting MBMS data sent from RNCs 400-1~400-3 to radio data and transmitting the radio data to UE 800 in cell 600 through the S-CCPCH. Since details of these operations are defined in 3GPP and commonly known, descriptions thereof will be omitted.

Here, with reference to FIG. 2, gains of UE 800 when MBSFN is used will be described in comparison with gains when MBSFN is not used. In FIG. 2, (a) shows frequency utilization efficiency of UE 800 when MBSFN is used, disclosed in Table 7 of Non Patent Literature 2 and (b) shows frequency utilization efficiency of UE 800 when MBSFN is not used, disclosed in Table 8 of Non Patent Literature 2.

First, a case will be described as an example where UE 800 is a Type-3 receiver and has a configuration of combining signals received through three radio links (receiver capable of equalizing 3RLs, RL=Radio Link). In this case, the frequency utilization efficiency is 0.602 [b/s/Hz] when MBSFN is used, whereas the frequency utilization efficiency is as low as 0.4736 [b/s/Hz] when MBSFN is not used. On the other hand, when there are seven radio links, the frequency utilization efficiency is 1.075 [b/s/Hz] when MBSFN is used, which is significantly different from 0.4736 [b/s/Hz] when MBSFN is not used.

It is obvious from this result that gains of UE 800 are very small when MBSFN is not used.

CITATION LIST

Non Patent Literature

Non Patent Literature 1: 3GPP TS 23.246
Non Patent Literature 2: 3GPP TS 25.905
Non Patent Literature 3: 3GPP TS 29.061
Non Patent Literature 4: 3GPP TS 29.060
Non Patent Literature 5: 3GPP TS 25.413
Non Patent Literature 6: 3GPP TS 25.402
Non Patent Literature 7: 3GPP TS 24.008

SUMMARY OF INVENTION

Technical Problem

However, in different RNCs of the related mobile communication system, there is no means for unifying S-CCPCH radio resources in cells under their control and MBMS data transmission timing, and therefore each RNC independently determines radio resources in a cell under its control and transmission timing.

For this reason, one MBSFN cluster can only be formed for each RNC and cannot be formed extending over different RNCs. That is, one MBSFN cluster cannot be formed between cells under the control of different RNCs.

Therefore, in the vicinity of a cell boundary of Nodes B connected to different RNCs, since a UE is located on a boundary of MBSFN clusters, there is a problem in which the effect of MBSFN of receiving MBMS data with large gains is lessened.

Moreover, assuming the number of Nodes B connected to one RNC is constant, a communication area where there are more UEs requires more Nodes B. Thus, the communication area covered by one RNC shrinks in size. This means that there are more boundaries of communication areas of RNCs in areas where there are more UEs.

Therefore, even when one MBSFN cluster is formed for each RNC, more boundaries of MBSFN clusters are formed in areas where there are more UEs, and there is a problem in which the effect of MBSFN is lessened.

It is therefore an object of the present invention to provide a mobile communication system, a control station, a base station, a communication method and a program that, by expanding the range of an MBSFN cluster, reduces the number of boundaries of MBSFN clusters, and thereby solves the above described problems.

Solution to Problem

A first mobile communication system according to the present invention is a mobile communication system having a mobile station, base stations each of which forms a cell and transmits MBMS data to a mobile station existing in the cell, and control stations each of which controls a base station connected thereto,
wherein the control stations include:
at least a first control station; and
a second control station that determines a frequency and timing for transmitting the MBMS data in the cell and instructs the first control station of the determined frequency and timing, and
each of the first and second control stations
establishes time synchronization with another control station,
instructs the base station connected thereto to set the cell to the frequency determined by the second control station, and
transmits the MBMS data to the connected base station in accordance with the transmission timing determined by the second control station, and
the mobile station receives the MBMS data.

A second mobile communication system according to the present invention is a mobile communication system having a mobile station, and base stations each of which forms a cell and transmits MBMS data to a mobile station existing in the cell, wherein
the base stations include:
at least a first base station; and
a second base station that determines a frequency and timing for transmitting the MBMS data in the cell and instructs the first base station of the determined frequency and timing, and
each of the first and second base stations
establishes time synchronization with another base station,
sets the cell to the frequency determined by the second base station, and
transmits the MBMS data to the mobile station in accordance with the transmission timing determined by the second base station, and
the mobile station receives the MBMS data.

The first control station according to the present invention is a control station that is connected to a base station that forms a cell and transmits MBMS data to a mobile station existing in the cell, including:
a time synchronization unit for establishing time synchronization with another control station,
a control unit for determining a frequency and timing for transmitting the MBMS data in the cell, and
a communication unit for instructing the other control station of the determined frequency and transmission timing, instructing a base station connected thereto to set the cell to the determined frequency, and transmitting the MBMS data to the connected base station in accordance with the determined transmission timing.

The second control station according to the present invention is a control station that is connected to a base station that forms a cell and transmits MBMS data to a mobile station existing in the cell, including:
a time synchronization unit for establishing time synchronization with another control station, and
a communication unit for having a frequency and timing for transmitting the MBMS data in the cell instructed by another control station, instructing a base station connected thereto to set the cell to the frequency instructed by the other control station, and transmitting the MBMS data to the connected base station in accordance with the transmission timing instructed by the other control station.

The first base station according to the present invention is a base station that forms a cell and transmits MBMS data to a mobile station existing in the cell, including:
a time synchronization unit for establishing time synchronization with another base station;

a control unit for determining a frequency and timing for transmitting the MBMS data in the cell and setting the cell to the determined frequency; and a communication unit for instructing another base station of the determined frequency and transmission timing, and transmitting the MBMS data to the mobile station in accordance with the determined transmission timing.

The second base station according to the present invention is a base station that forms a cell and transmits MBMS data to a mobile station existing in the cell, including:

a time synchronization unit for establishing time synchronization with another base station;

a communication unit for having a frequency and timing for transmitting the MBMS data in the cell instructed by another control station, and transmitting the MBMS data to a mobile station in accordance with the transmission timing instructed by the other control station; and a control unit for setting the cell to the frequency instructed by the other base station.

The first communication method according to the present invention is a communication method by a mobile communication system including a mobile station, base stations each of which forms a cell and transmits MBMS data to a mobile station existing in the cell, and control stations each of which controls a base station connected thereto, wherein the control stations include at least a first control station and a second control station, and the method includes the steps of:

the second control station determining a frequency and timing for transmitting the MBMS data in the cell and instructing the first control station of the determined frequency and timing;

each of the first and second control stations establishing time synchronization with another control station;

each of the first and second control stations instructing the base station connected thereto to set the cell to the frequency determined by the second control station;

each of the first and second control stations transmitting the MBMS data to the connected base station in accordance with the transmission timing determined by the second control station; and the mobile station receiving the MBMS data.

The second communication method according to the present invention is a communication method by a mobile communication system including a mobile station, and base stations each of which forms a cell and transmits MBMS data to a mobile station existing in the cell, wherein the base stations include at least a first base station and a second base station, and the method includes the steps of:

the second base station determining a frequency and timing for transmitting the MBMS data in the cell and instructing the first base station of the determined frequency and timing;

each of the first and second base stations establishing time synchronization with another base station;

each of the first and second base stations sets the cell to the frequency determined by the second base station;

each of the first and second base stations transmitting the MBMS data to the mobile station in accordance with the transmission timing determined by the second base station; and the mobile station receiving the MBMS data.

The third communication method according to the present invention is a communication method by a control station that is connected to a base station that forms a cell and transmits MBMS data to a mobile station existing in the cell, including the steps of:

establishing time synchronization with another control station;

determining a frequency and timing for transmitting the MBMS data in the cell;

instructing the other control station of the determined frequency and transmission timing;

instructing a base station connected thereto to set the cell to the determined frequency; and transmitting the MBMS data to the connected base station in accordance with the determined transmission timing.

The fourth communication method according to the present invention is a communication method by a control station that is connected to a base station that forms a cell and transmits MBMS data to a mobile station existing in the cell, including the steps of:

establishing time synchronization with another control station;

receiving an instruction on a frequency and timing for transmitting the MBMS data in the cell from the other control station;

instructing the connected base station to set the cell to the frequency instructed by the other control station; and transmitting the MBMS data to the connected base station in accordance with the transmission timing instructed by the other control station.

The fifth communication method according to the present invention is a communication method by a base station that forms a cell and transmits MBMS data to a mobile station existing in the cell, including the steps of:

establishing time synchronization with another base station;

determining a frequency and timing for transmitting the MBMS data in the cell;

instructing the other base station of the determined frequency and transmission timing; setting the cell to the determined frequency; and transmitting the MBMS data to a mobile station in accordance with the determined transmission timing.

The sixth communication method according to the present invention is a communication method by a base station that forms a cell and transmits MBMS data to a mobile station existing in the cell, including the steps of:

establishing time synchronization with another base station;

receiving an instruction on a frequency and timing for transmitting the MBMS data in the cell from the other base station;

setting the cell to the frequency instructed by the other base station; and transmitting the MBMS data to the mobile station in accordance with the transmission timing instructed by the other base station.

The first program according to the present invention causes a control station that is connected to a base station that forms a cell and transmits MBMS data to a mobile station existing in the cell to execute the processes of:

establishing time synchronization with another control station;

determining a frequency and timing for transmitting the MBMS data in the cell;

instructing the other control station of the determined frequency and transmission timing;

instructing a base station connected thereto to set the cell to the determined frequency; and transmitting the MBMS data to the connected base station in accordance with the determined transmission timing.

The second program according to the present invention causes
a control station that is connected to a base station that forms a cell and transmits MBMS data to a mobile station existing in the cell to execute the processes of:
establishing time synchronization with another control station;
receiving an instruction on a frequency and timing for transmitting the MBMS data in the cell from the other control station;
instructing a base station connected thereto to set the cell to the frequency instructed by the other control station; and
transmitting the MBMS data to the connected base station in accordance with the transmission timing instructed by the other control station.

The third program according to the present invention causes a base station that forms a cell and transmits MBMS data to a mobile station existing in the cell to execute the processes of:
establishing time synchronization with another base station;
determining a frequency and timing for transmitting the MBMS data in the cell;
instructing the other base station of the determined frequency and transmission timing;
setting the cell to the determined frequency; and
transmitting the MBMS data to the mobile station in accordance with the determined transmission timing.

The fourth program according to the present invention causes a base station that forms a cell and transmits MBMS data to a mobile station existing in the cell to execute the processes of:
establishing time synchronization with another base station;
receiving an instruction on a frequency and timing for transmitting the MBMS data in the cell from the other base station;
setting the cell to the frequency instructed by the other base station; and
transmitting the MBMS data to the mobile station in accordance with the transmission timing instructed by the other base station.

Advantageous Effects of Invention

According to the present invention, it is possible to transmit the same MBMS data using the same frequency and at the same transmission timing in all cells under the control of a control station or a base station.

Therefore, the present invention provides the advantage of being able to expand the range of a communication area made up of a plurality of cells in which the same MBMS data are transmitted using the same frequency and at the same transmission timing.

BRIEF DESCRIPTION OF DRAWINGS

FIG. 2 is a diagram illustrating gains of a UE when MBSFN is used;
FIG. 5 is a diagram illustrating an example of a first database stored in the storage unit of the RNC shown in FIG. 4;
FIG. 6 is a diagram illustrating an example of a second database stored in the storage unit of RNC shown in FIG. 4;
FIG. 9 is a diagram illustrating an example of a Session Start Request message transmitted from the BM-SC to GGSN in step S10 shown in FIG. 7;
FIG. 10 is a diagram illustrating an example of an MBMS Session Start Request message transmitted from the GGSN to SGSN in step S20 shown in FIG. 7;
FIG. 11 is a diagram illustrating an example of an MBMS Session Start Request message transmitted from the SGSN to RNC in step S30 shown in FIG. 7;
FIG. 12 is a diagram illustrating another example of the first database stored in the storage unit of the RNC shown in FIG. 4.

DESCRIPTION OF EMBODIMENTS

Hereinafter, exemplary embodiments of the present invention will be described with reference to the accompanying drawings.

Figure 1:
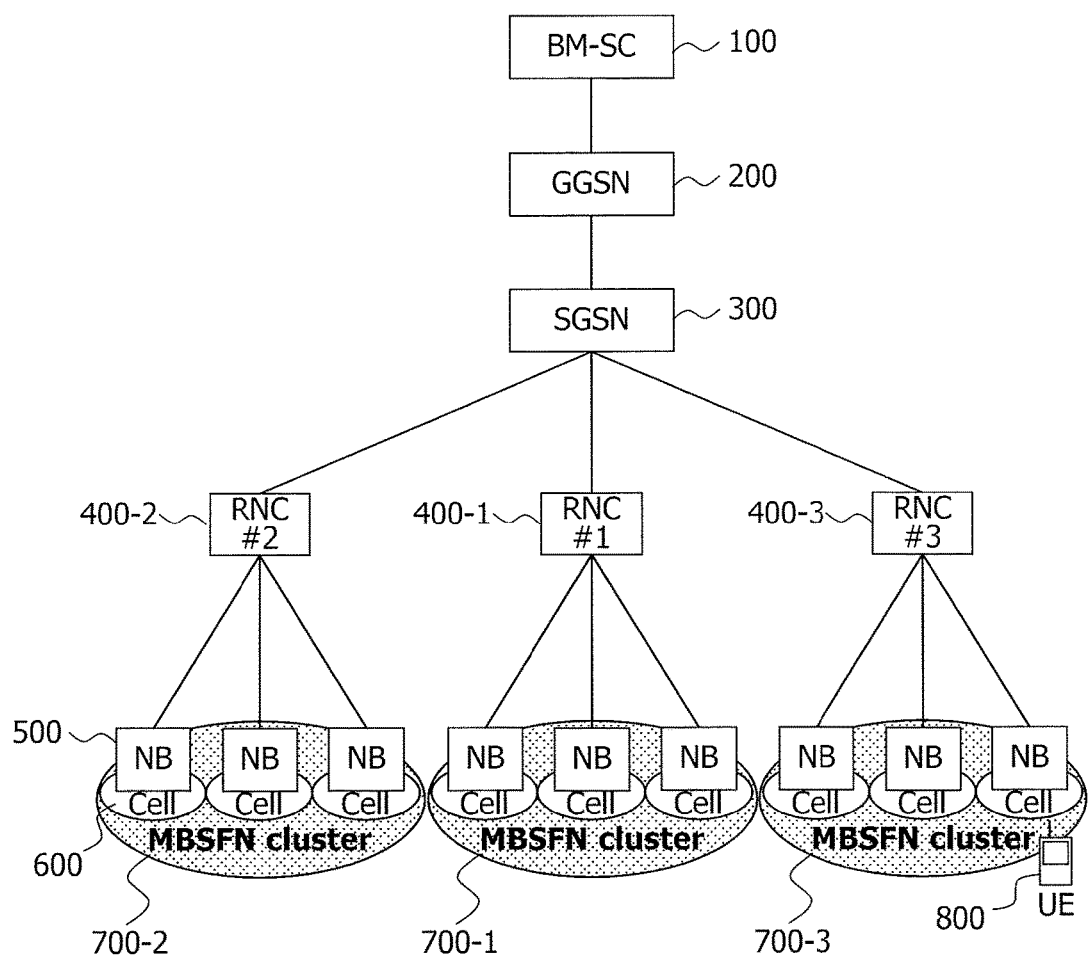
FIG. 1 is a block diagram illustrating an example of a configuration of a related mobile communication system.
Figure 3:
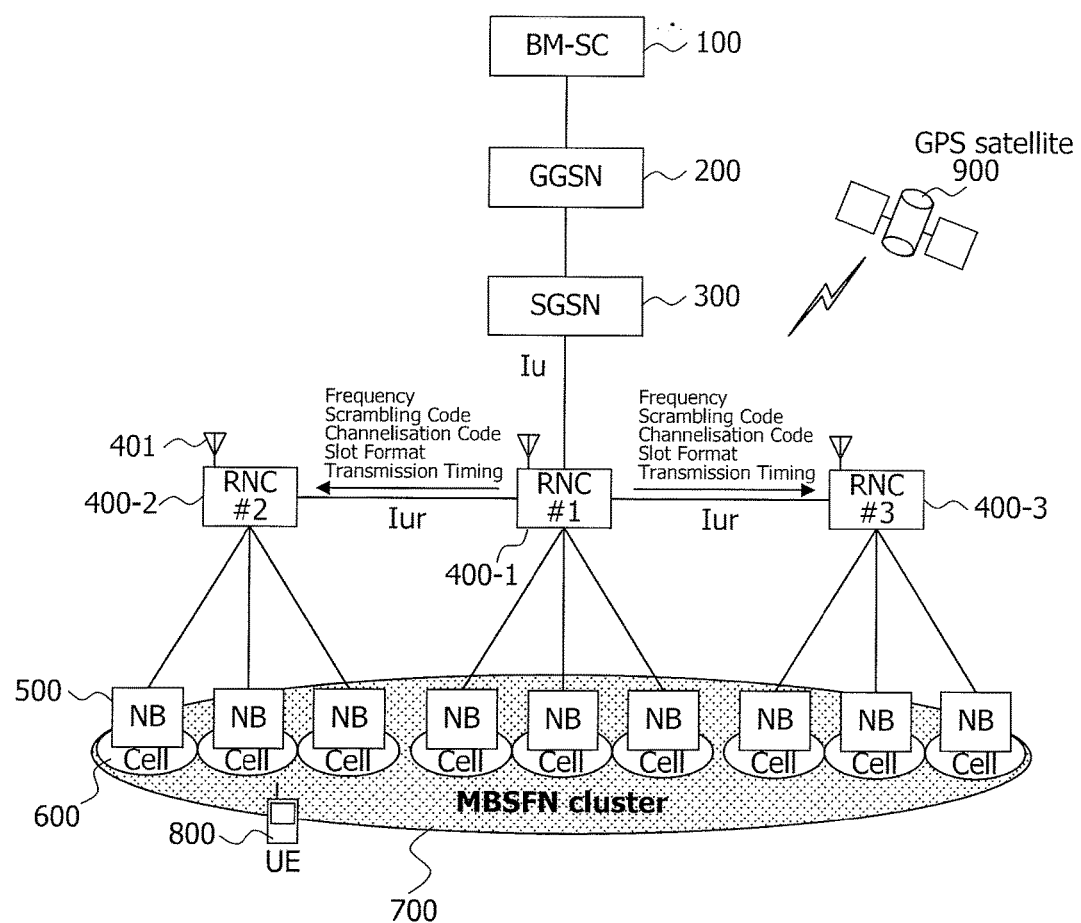
FIG. 3 is a diagram illustrating an example of a configuration of a mobile communication system of the present invention.

(1) First Exemplary Embodiment (1-1) Configuration of the First Exemplary Embodiment As shown in FIG. 3, the entire configuration of the mobile communication system according to the exemplary embodiment differs from that in FIG. 1 in that RNC 400-1~400-3 are connected via Iur interfaces. Also RNC 400-2 and RNC 400-3 are connected via SGSN 300 and Iu interface, although not shown in the figure.

RNC 400-1 is an example of the second control station and RNCs 400-2 and 400-3 are examples of the first control station.

In the present exemplary embodiment, one RNC 400 (RNC 400-1 in FIG. 3) from among RNCs 400-1~400-3 determines the set values for the radio resource (frequency, scrambling code, channelization code, slot format) for the S-CCPCH in the cell 600 under the control of RNCs 400-1~400-3 and the set value for the transmission timing of the MBMS data, and instructs them to the other RNCs 400 (RNCs 400-2, 400-3 in FIG. 3).

Specifically, RNC 400-1 determines the MBSFN-Indicator, which is to be an identifier representing a combination of the set values for the radio resource of the S-CCPCH in the cell 600 under the control of RNCs 400-1~400-3 and the set value for transmission timing of MBMS data.

For those purposes, BM-SC 100, GGSN 200, SGSN 300, and RNCs 400-1~400-3 are additionally provided with more functions than those shown in FIG. 1. Now, these configurations will be described with reference to FIG. 4.

Figure 4:
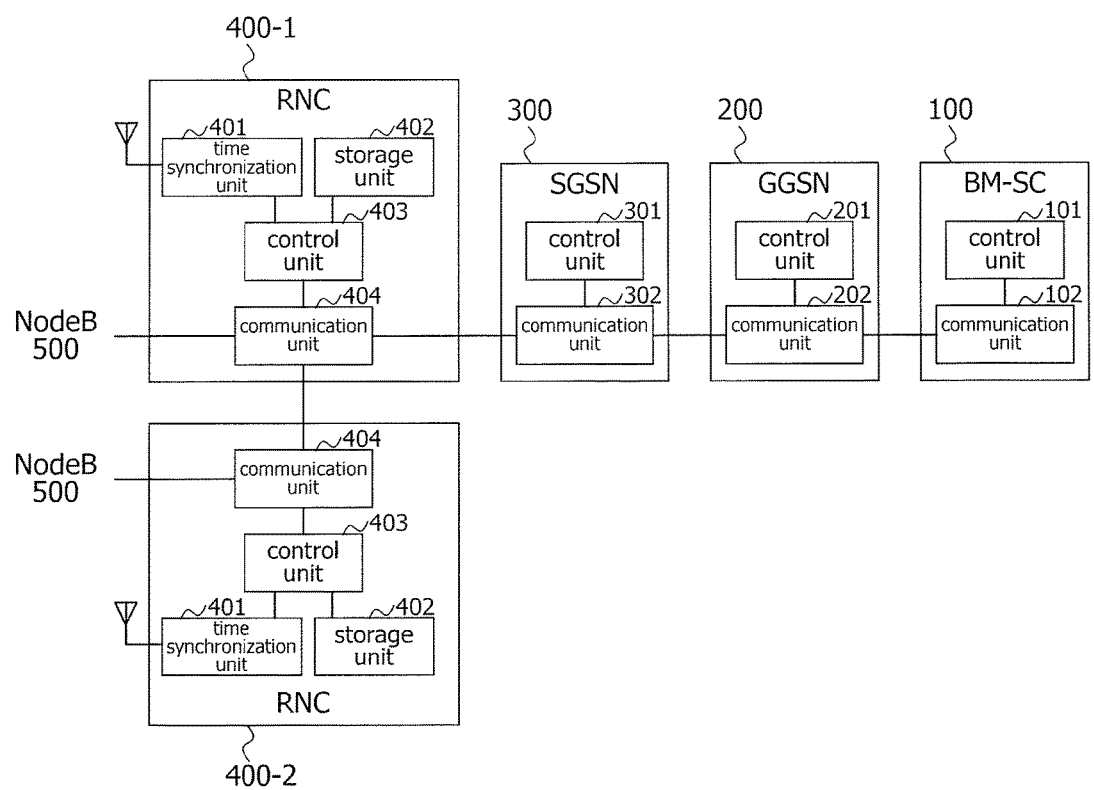
FIG. 4 is a block diagram illustrating an example of a configuration of the BM-SC, GGSN, SGSN and RNC shown in FIG. 3.

As shown in FIG. 4, BM-SC 100 includes control unit 101 and communication unit 102.

Control unit 101 generates a message to be transmitted to another node. For example, in the present exemplary embodiment, control unit 101 generates a message including information on whether it is necessary or not to use MBSFN.

Control unit 101 performs various operations other than those mentioned above, such as user authentication, MBMS data management, and distribution scheduling described with reference to FIG. 1, by controlling the entire BM-SC 100.

Communication unit 102 transmits and receives a message and MBMS data to and from another node. For example, in the present exemplary embodiment, communication unit 102 transmits a message including information on whether it is necessary or not to use MBSFN generated by control unit 101 to GGSN 200.

Here, control unit 101 knows RNC 400-1, which is responsible for determining the MBSFN Indicator when the MBSFN is used. Specifically, a storage unit (not shown) in BM-SC 100 or a person operating BM-SC 100 has a list (not shown) indicating RNC 400-1 that is to play the role. Therefore, control unit 101 addresses the above-mentioned generated message to RNC 400-1.

GGSN 200 includes control unit 201 and communication unit 202.

Control unit 201 generates a message to be transmitted to another node. For example, in the present exemplary embodiment, control unit 201 generates a message including information on whether it is necessary or not to use the MBSFN, which was informed by BM-SC 100.

Control unit 201 performs various operations other than those described above by controlling the entire GGSN 200.

Communication unit 202 transmits and receives a message and the MBMS data to and from another node. For example, in the present exemplary embodiment, communication unit 202 receives a message including information on whether it is necessary or not to use the MBSFN from BM-SC 100, and transmits a message including information on whether it is necessary or not to use the MBSFN, which was generated by control unit 201, to SGSN 300.

SGSN 300 includes control unit 301 and communication unit 302.

Control unit 301 generates a message to be transmitted to another node. For example, in the present exemplary embodiment, control unit 301 generates a message including information on whether it is necessary or not to use the MBSFN, which was informed by GGSN 200.

Control unit 301 performs various operations other than those mentioned above, such as routing, mobility management, and session management described with reference to FIG. 1, by controlling the entire SGSN 300.

Communication unit 302 transmits and receives a message and the MBMS data to and from another node. For example, in the present exemplary embodiment, communication unit 302 receives a message including information on whether it is necessary or not to use the MBSFN from GGSN 200, and transmits a message including information on whether it is necessary or not to use the MBSFN, which was generated by control unit 301, to RNC 400-1.

Each of RNCs 400-1 and 400-2 includes time synchronization unit 401, storage unit 402, control unit 403, and communication unit 404. RNC 400-3 is the same as RNC 400-2 in configuration and operations.

Time synchronization unit 401 receives time information of UTC (Coordinated Universal Time) from GPS (Global Positioning System) satellite 900 and synchronizes itself with UTC. A method of time synchronization with UTC by using GPS is commonly known, and therefore descriptions thereof will be omitted.

RNCs 400-1~400-3 synchronize with UTC in the above mentioned manner.

This makes it possible to establish time synchronization between RNCs 400-1 and 400-3.

The method of establishing time synchronization between RNCs 400-1 and 400-3 is not limited to the aforementioned method using GPS, but the following methods defined in 3GPP can also be used.

3GPP synchronization in UTRAN (UMTS Terrestrial Radio Access Network, UMTS=Universal Mobile Telecommunications System)
    Using NTP (Network Time Protocol)
    Relying on IP multicast distribution
    A method defined in IEEE (Institute of Electrical and Electronic Engineers) 1588

Storage unit 402 stores a first database and a second database.

The first database includes Decision Flag indicating whether it is responsible for determining the MBSFN Indicator or not, and if it is responsible for that, also includes a list of RNCs 400, to which the determined MBSFN Indicator is informed.

Therefore, control unit 403 knows whether it is responsible for determining the MBSFN Indicator or not, and if it is responsible for that, also knows RNC 400, to which the determined MBSFN Indicator is informed.

In the present exemplary embodiment, RNC 400-1 is responsible for determining MBSFN Indicator. For that reason, Decision Flag is set to "1" indicating "enabled" in the first database stored in RNC 400-1 and the list of destination RNCs 400 includes RNCs 400-2 and 400-3, to which the same MBMS data is to be transmitted, as shown in FIG. 5.

Although not shown in the figure, Decision Flag is set to "0" indicating "disabled" in the first database stored in RNCs 400-2 and 400-3. The list of destination RNCs 400 also includes the other RNCs 400 (for example, RNCs 400-1 and 400-3 in the case of RNC 400-2), to which the same MBMS data is to be transmitted.

As shown in FIG. 6, the second database includes the MBSFN-Indicator and a combination of the set values for the radio resource and the set value for the transmission timing associated with the MBSFN-Indicator in cell 600.

If Decision Flag is set to "enabled", control unit 403 determines the MBSFN-Indicator when MBSFN is used. The MBSFN-Indicator determined here is to be instructed to the other RNCs 400 as described later.

In the present exemplary embodiment, Decision Flag of RNC 400-1 is enabled. Accordingly, control unit 403 of RNC 400-1 determines MBSFN-Indicator and the determined MBSFN-Indicator is instructed to the other RNCs 400-2 and 400-3.

Control unit 403 generates a message and an instruction to be transmitted to another node. For example, in the present exemplary embodiment, control unit 403 selects the set value for the radio resource that is associated with the MBSFN-Indicator determined by RNC 400-1 with reference to the second database in FIG. 6 and generates a setting instruction for the S-CCPCH of the radio resource. Control unit 403 of RNC 400-1, in particular, also generates a message including MBSFN-Indicator determined by itself.

In addition, control unit 403 is capable of detecting timing deviation between RNC 400-1 and each Node B 500 under the control of RNC 400-1 by using the procedure Node Synchronisation as shown in Non Patent Literature 6. Accordingly, control unit 403 obtains the timing for transmitting the MBMS data to each Node B 500 under its control so that the MBMS data is transmitted to all cells 600 under its control at the same timing. Then, control unit 403 selects the set value for transmission timing associated with the MBSFN-Indicator determined by RNC 400-1 with reference to the second database in FIG. 6, and schedules the timing for transmitting the MBSFN data to each Node B 500 under its control so that the MBMS data is transmitted to all cells 600 under its control at that transmission timing.

Control unit 403 performs various operations other than those described above by controlling the entire RNC 400 of itself.

Communication unit 404 transmits and receives a message, the MBMS data, and an instruction to and from another node. For example, in the present exemplary embodiment, communication unit 404 transmits a setting instruction for the S-CCPCH of the radio resource that was determined by RNC 400-1 and generated by control unit 403 to all Node Bs 500 under its control. Communication unit 404 of RNC 400-1, in particular, also receives a message including information on whether it is necessary or not to use MBSFN from SGSN 300, and transmits a message including the MBSFN-Indicator generated by control unit 403 to RNCs 400-2 and 400-3.

In the above-mentioned manner, RNCs 400-1~400-3 transmit the setting instruction for the S-CCPCH of the radio resource determined in RNC 400-1 to all Node Bs 500 under their control.

Consequently, the same radio resource is available for the S-CCPCH in all cells 600 under the control of RNCs 400-1~400-3.

Communication unit 404 transmits the MBMS data to each Node B 500 under its control in accordance with the timing scheduled by control unit 403.

In the above-mentioned manner, RNCs 400-1~400-3 adjust the timing for transmitting the MBMS data in all cells 600 under their control to the transmission timing determined by RNC 400-1.

Furthermore, time synchronization is established between RNCs 400-1 and 400-3.

This allows the same MBMS data to be transmitted at the same transmission timing in all cells 600 under the control of RNCs 400-1~400-3.

As described so far, all cells 600 under the control of RNCs 400-1~400-3 can transmit the same MBMS data using the same frequency and at the same transmission timing, making it possible to form wide-range MBSFN cluster 700 extending over RNCs 400-1~400-3.

(1-2) Operation of First Exemplary Embodiment

Next, the operation of the mobile communication system of the present exemplary embodiment at the start of MBMS, that is, at the start of a session, will be described according to a C-plane (Control Plane) sequence chart shown in FIG. 7. The "C-plane" refers to a control plane and shows a protocol for signals used for control in a network.

Figure 7:
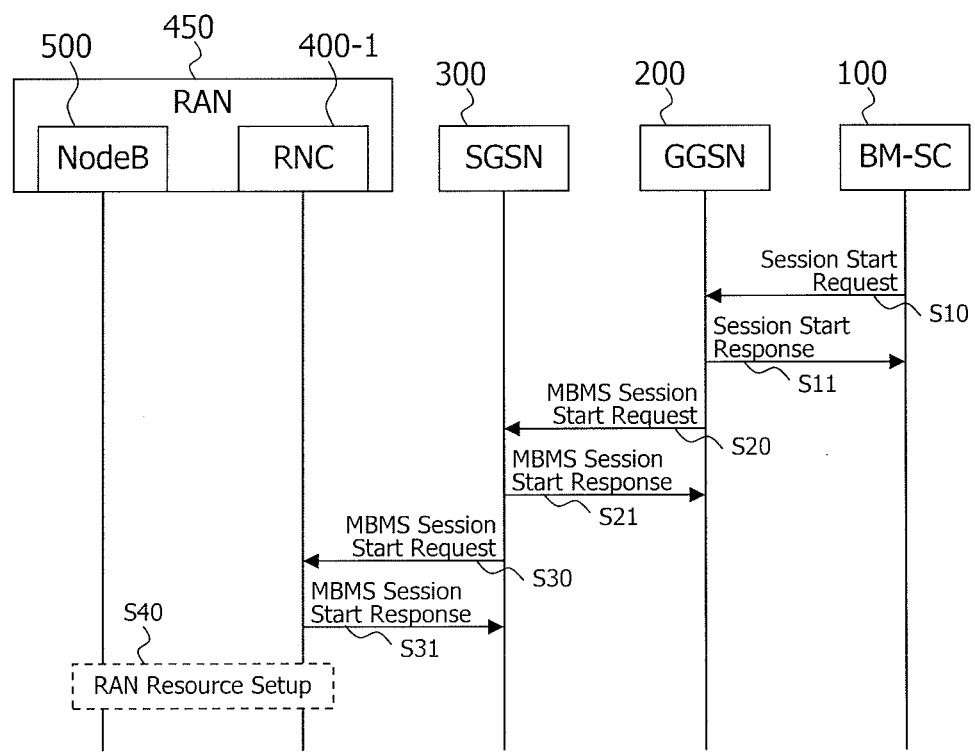
FIG. 7 is a C-plane sequence chart illustrating an example of operation at the start of a session of MBMS in the mobile communication system of the present invention.
Figure 8:
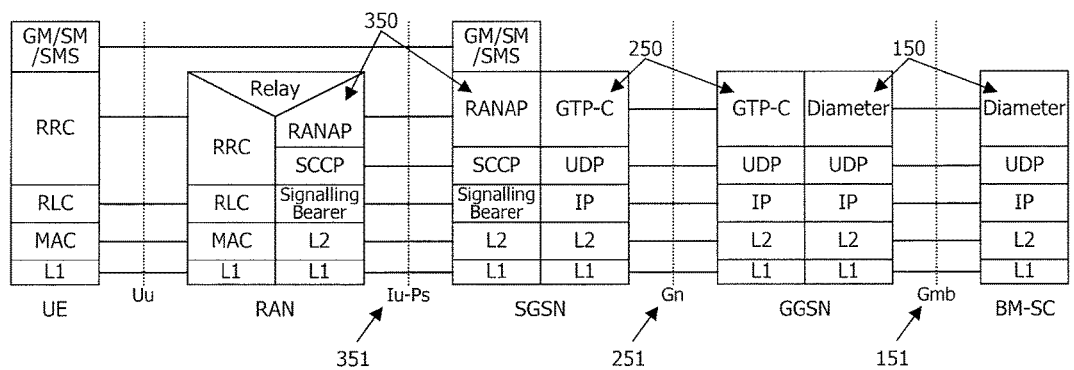
FIG. 8 is a diagram illustrating a C-plane protocol stack used to transmit/receive the C-plane message shown in FIG. 7.

In order to transmit/receive C-plane messages shown in FIG. 7, the present exemplary embodiment uses a C-plane protocol stack shown in FIG. 8 without changing it. Since this protocol stack is defined in 3GPP, detailed descriptions thereof will be omitted.

As shown in FIG. 7, in step S10, communication unit 102 of BM-SC 100 transmits a Session Start Request message addressed to RNC 400-1 to GGSN 200 at the start of the MBMS session. The details of Session Start Request message are described in Non Patent Literature 3.

In the present exemplary embodiment, control unit 101 of BM-SC 100 newly adds a parameter MBSFN-Flag 30 that represents whether or not to use the MBSFN to the Session Start Request message in step S10 as shown in FIG. 9. Here, if it is desired to start the MBMS in the MBSFN, control unit 101 sets MBSFN-Flag 30 to "1" indicating "enabled". The set value for this parameter is used in determining whether or not to use the MBSFN in each of RNCs 400-1~400-3.

Next, communication unit 202 of GGSN 200 returns a Session Start Response message which is a response message to the Session Start Request message to BM-SC 100 in step S11.

The Session Start Request message and Session Start Response message transmitted and received between BM-SC 100 and GGSN 200 are transmitted through Gmb interface 151 shown in FIG. 8 using Diameter Protocol 150. Details of Diameter Protocol 150 are described in Non Patent Literature 3.

Then in step S20, communication unit 202 of GGSN 200 transmits a MBMS Session Start Request message addressed to RNC 400-1 to SGSN 300.

In the present exemplary embodiment, control unit 201 of GGSN 200 newly adds a parameter corresponding to MBSFN-Flag 30 included in the above-mentioned Session Start Request message to the MBMS Session Start Request message in step S20 as shown in FIG. 10. The number of bits of this parameter is made the same as that of the parameter included in the Session Start Request message.

Next, communication unit 302 of SGSN 300 returns an MBMS Session Start Response message which is a response message to the MBMS Session Start Request message to GGSN 200 in step S21.

The MBMS Session Start Request message and MBMS Session Start Response message transmitted and received between GGSN 200 and SGSN 300 are transmitted through Gn interface 251 shown in FIG. 8 using GTP-C Protocol 250. Details of GTP-C Protocol 250 are described in Non Patent Literature 4.

Next, communication unit 302 of SGSN 300 transmits an MBMS Session Start Request message addressed to RNC 400-1 to RNC 400-1 in step S30. Details of the MBMS Session Start Request message are described in Non Patent Literature 5.

In the present exemplary embodiment, control unit 301 of SGSN 300 adds a group called "MBSFN Information" as shown in FIG. 11 in the MBMS Session Start Request message in step S30 and includes therein MBSFN-Flag as IE (Information Element) to be new parameters.

Next, communication unit 404 of RNC 400-1 returns an MBMS Session Start Response message which is a response message to the MBMS Session Start Request message to SGSN 300 in step S31.

The MBMS Session Start Request message and MBMS Session Start Response message transmitted and received between SGSN 300 and RNC 400-1 are transmitted through Iu-PS interface 351 shown in FIG. 8 using RANAP Protocol 350. Details of RANAP Protocol 350 are described in Non Patent Literature 5.

Control unit 403 of RNC 400-1 can learn whether or not to use the MBSFN from the MBSFN-Flag included in the MBMS Session Start Request message in step S30.

If the MBSFN-Flag is set to "0" indicating "disabled", control unit 403 of RNC 400-1 judges that the MBSFN is not to be used and performs a conventional MBMS process.

On the other hand, if the MBSFN-Flag is set to "1" indicating "enabled", control unit 403 of RNC 400-1 judges that the MBSFN is to be used.

At this moment, Decision Flag is set to "1" indicating "enabled" in the first database of RNC 400-1 as shown in FIG. 5.

Accordingly, control unit 403 of RNC 400-1 judges that it is responsible for determining the MBSFN Indicator, and then determines a MBSFN Indicator among the MBSFN Indicators in the second database shown in FIG. 6 and includes the determined MBSFN Indicator in the MBMS Session Start Request message or another message.

Then, communication unit 404 of RNC 400-1 forwards the MBMS Session Start Request message to RNCs 400-2 and 400-3. In order to include the MBSFN Indicator determined in the above-mentioned step into a different message, that different message is forwarded together on this occasion.

Each control unit 403 of RNCs 400-2 and 400-3 can learn whether or not to use the MBSFN from the MBMS Session Start Request message forwarded from RNC 400-1, and learn the MBSFN Indicator determined by RNC 400-1 from the MBMS Session Start Request message or another message forwarded from RNC 400-1.

Then in step S40, the RAN Resource Setup procedure is performed in RNCs 400-1~400-3 with Node Bs 500 under their control.

In the RAN Resource Setup procedure, each communication unit 404 of RNCs 400-1~400-3 transmits a setting instruction for the S-CCPCH of the set values for radio resource associated with the MBSFN Indicator determined by RNC 400-1 to all Node Bs 500 under its control. In response, all Node Bs 500 under the control of RNCs 400-1~400-3 set the radio resources to S-CCPCH.

Consequently, the same radio resource is available for the S-CCPCH in all cells 600 under the control of RNCs 400-1~400-3.

Each time synchronization unit 401 of RNCs 400-1~400-3 receives time information of UTC from GPS satellite 900 and synchronizes itself with UTC.

Consequently, RNCs 400-1~400-3 are synchronized with each other.

Each control unit 403 of RNCs 400-1~400-3 adjusts the timing for transmitting the MBMS data in all cells 600 under its control to the transmission timing associated with the MBSFN Indicator determined by RNC 400-1 by scheduling.

Consequently, the same MBMS data can be transmitted at the same transmission timing in all cells 600 under the control of RNCs 400-1~400-3.

As can be seen from the above description, the present exemplary embodiment can form wide MBSFN cluster 700 across RNCs 400-1~400-3, since it can transmit the same MBMS data at the same transmission timing by using the same frequency in all cells 600 under the control of RNCs 400-1~400-3.

Therefore, UE 800 can benefit from the advantage of the MBSFN even if it is placed on the boundary between the service area of RNC 400-1 and the service area of RNC 400-2 or the service area of RNC 400-3.

In addition, UE 800 can keep receiving the MBMS data continuously without considering the difference of RNC, the difference of Node B, or the difference of the cell.

(2) Second Exemplary Embodiment (2-1) Configuration of the Second Exemplary Embodiment The entire configuration of the mobile communication system according to the present exemplary embodiment is the same as that shown in FIG. 3.

Also, configurations of BM-SC 100, GGSN 200, SGSN 300, and RNCs 400-1~400-3 of the present exemplary embodiment are the same as that shown in FIG. 4.

The present exemplary embodiment, however, is different in that one RNC 400 (RNC 400-1 in FIG. 3) from among RNCs 400-1~400-3 operates to negotiate with the other RNCs 400 (RNCs 400-2 and 400-3 in FIG. 3) in determining the MBSFN-Indicator to be used for the MBSFN.

Therefore, the description below will focus on what is different from the first exemplary embodiment.

Control unit 101 of BM-SC 100 knows RNC 400-1 that is responsible for negotiating for the MBSFN Indicator when it uses the MBSFN. Specifically, a storage unit (not shown) in BM-SC 100 or a person operating BM-SC 100 has a list (not shown) indicating RNC 400-1 that is to play the role. Therefore, control unit 101 addresses the Session Start Request message to RNC 400-1.

Each storage unit 402 of RNCs 400-1~400-3 stores a database that includes a Negotiation Flag indicating whether that unit is responsible for negotiating for a MBSFN Indicator or not as the first database, and if the unit is responsible for that, the database also includes a list of RNCs 400, with which the unit is to negotiate. RNC 400 with which storage unit 402 negotiates is also the destination to which the MBSFN Indicator determined by the negotiation is informed.

Accordingly, each control unit 403 of RNCs 400-1~400-3 knows whether it is responsible for negotiating for the MBSFN Indicator or not, and if it is responsible for that, also knows RNC 400, with which it negotiates.

In the present exemplary embodiment, RNC 400-1 is responsible for negotiating for the MBSFN Indicator. Accordingly, Negotiation Flag is set to "1" indicating "enabled" in the first database stored in RNC 400-1 and the list of RNCs 400, with which the unit negotiates, includes RNCs 400-2 and 400-3, to which the same MBMS data is transmitted, as shown in FIG. 12.

Although not shown in the figure, the Negotiation Flag is set to "0" indicating "disabled" in the first database stored in RNCs 400-2 and 400-3. The list of RNCs 400, with which the unit negotiates, also includes the other RNCs 400 (for example, RNCs 400-1 and 400-3 in the case of RNC 400-2), to which the same MBMS data is transmitted.

Each storage unit 402 of RNCs 400-1~400-3 also stores the second database as shown in FIG. 6, as in the first exemplary embodiment.

(2-2) Operations of the Second Exemplary Embodiment

The C-plane sequence chart illustrating the operation at the start of a session of the MBMS in the mobile communication system according to the present exemplary embodiment is the same as that shown in FIG. 7, and therefore the description thereof will be omitted.

The present exemplary embodiment, however, is different in that the operations shown below are performed in the case where the MBSFN-Flag included in the MBMS Session Start Request message in step S30 is set to "1" indicating "enabled".

In the present exemplary embodiment, the Negotiation Flag is set to "1" indicating "enabled" in the first database of RNCs 400-1 as shown in FIG. 12.

Accordingly, control unit 403 of RNC 400-1 judges that it is responsible for negotiating for the MBSFN Indicator, and hence negotiates with the other RNCs 400-2 and 400-3.

In the negotiation, communication unit 404 of RNC 400-1 first transmits a message including the candidates to be used for the MBSFN-Indicator included in the second database shown in FIG. 6 to RNCs 400-2 and 400-3.

In response, each control unit 403 of RNCs 400-2 and 400-3 judges the MBSFN-Indicator available for itself, and transmits a message including the available MBSFN-Indicator from communication unit 404 to RNC 400-1.

Control unit 403 of RNC 400-1 determines one MBSFN-Indicator based on the MBSFN-Indicators available both in itself and the other RNCs 400-2 and 400-3. A criterion for this decision may be, though not limited to, the MBSFN-Indicator that is available for great number of RNCs.

Operations after here are the same as those of the first exemplary embodiment.

Thus, the present exemplary embodiment can also form wide-range MBSFN cluster 700 extending over RNCs 400-1~400-3.

(3) Third Exemplary Embodiment (3-1) Configuration of Third Exemplary Embodiment A mobile communication system of the present exemplary embodiment is an example of a case where the present invention is applied to a network of evolved HSPA (High Speed Packet Access) or to a network of LTE (Long Term Evolution).

These networks can assume a Flat Architecture configuration with an RNC degenerated into a Node B.

Figure 13:
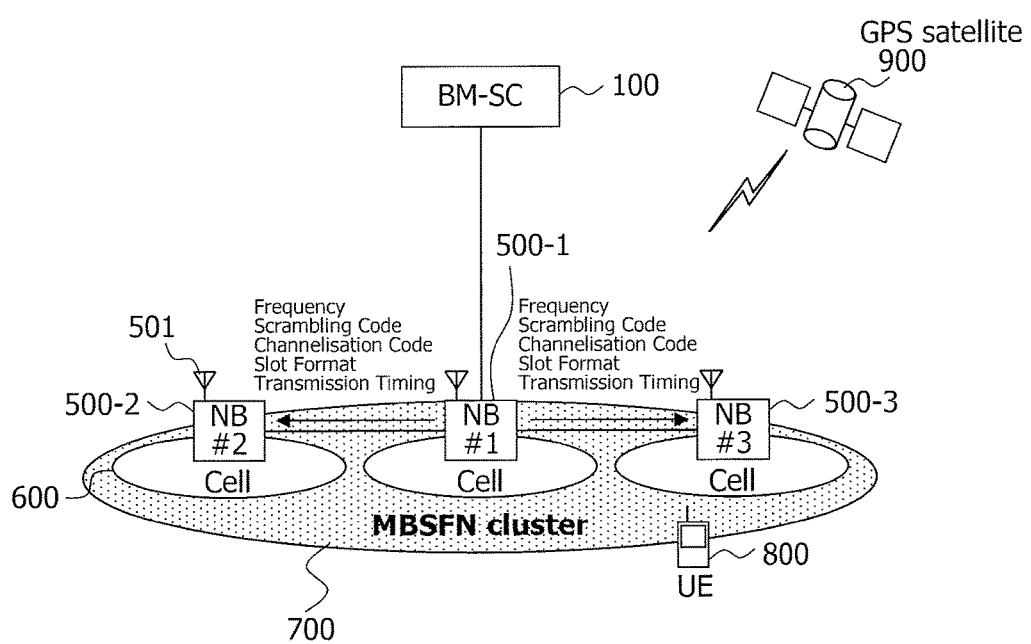
FIG. 13 is a block diagram illustrating another example of the configuration of the mobile communication system of the present invention.

As shown in FIG. 13, the mobile communication system of the present exemplary embodiment includes BM-SC 100 and Node B 500.

FIG. 13 omits nodes (GGSN and SGSN) between BM-SC 100 and Node B 500 and illustrates a configuration applicable to both networks of evolved HSPA and LTE.

Furthermore, FIG. 13 illustrates three Nodes B 500-1~500-3 (#1~#3) as Nodes B 500.

In addition, Node B 500-1 is connected to CN (not shown) including BM-SC 100. Node B 500-2 and Node B 500-3 are also connected to CN, although they are not shown in the figure. In addition, Node Bs 500-1~500-3 are connected to each other. Node Bs 500-1~500-3 are interfaced with each other by the X2 interface, for example, in the case of the LTE network.

Node B 500-1 is an example of the second base station and Node Bs 500-2 and 500-3 are examples of the first base station.

Figure 14:
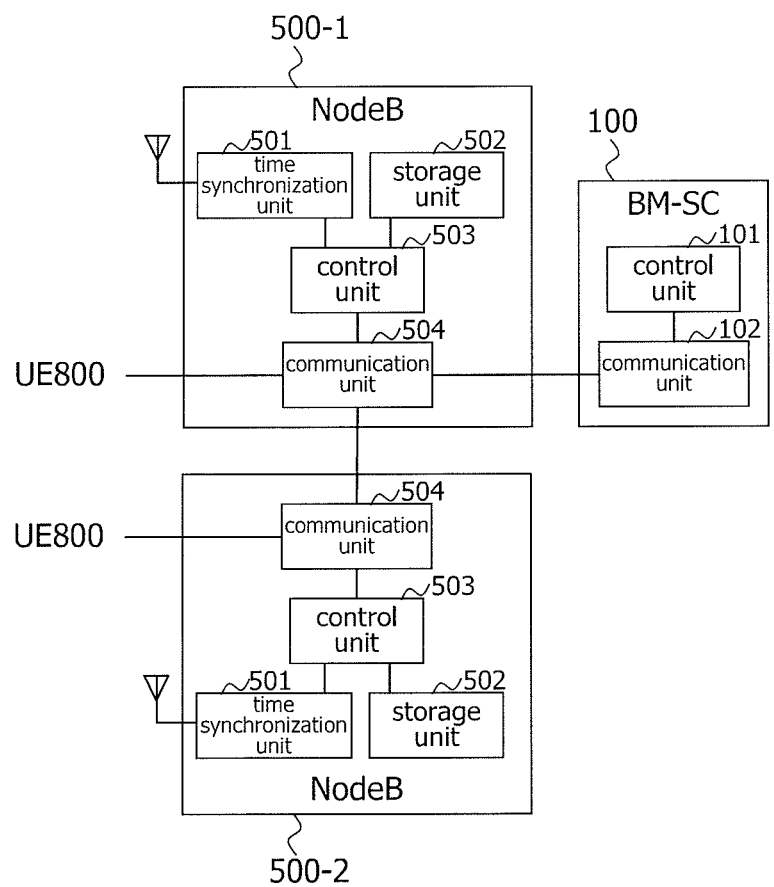
FIG. 14 is a block diagram illustrating an example of the configuration of the BM-SC and Node B shown in FIG. 13.

The configuration of BM-SC 100 is the same as that shown in FIG. 4, as shown in FIG. 14.

Each of Node Bs 500-1 and 500-2 includes time synchronization unit 501, storage unit 502, control unit 503, and communication unit 504. Node B 500-3 is the same as Node B 500-2 in configuration and operations.

The present exemplary embodiment has the configurations of the first and second exemplary embodiments modified to support the Flat Architecture, and applies the same method as that is applied to RNC 400 in the first and second exemplary embodiments to Node B 500.

Therefore, Node B 500-1 determines the MBSFN-Indicator to be used for the MBSFN by itself or by negotiation and instructs the decision to the other Node Bs 500-2 and 500-3 as in the first or second exemplary embodiment.

Time synchronization unit 501 receives time information of UTC from GPS satellite 900 and synchronizes itself with UTC.

Consequently, Node Bs 500-1~500-3 are synchronized with each other.

The methods for synchronizing Node Bs 500-1~500-3 with each other is not limited to the above-mentioned GPS-based method, and may include the method described with reference to FIG. 4.

Storage unit 502 stores the first database and the second database.

When the method of the first exemplary embodiment is applied, the first database includes the Decision Flag indicating whether it is responsible for determining the MBSFN Indicator or not, and if it is responsible for that, also includes a list of Node Bs 500, to which the determined MBSFN Indicator is informed.

In the present exemplary embodiment, Node B 500-1 is responsible for determining the MBSFN Indicator. For that reason, the Decision Flag is set to "1" indicating "enabled" in the first database stored in Node B 500-1 and the list of destination includes Node Bs 500-2 and 500-3, to which the same MBMS data is to be transmitted, as shown in FIG. 5.

On the other hand, when the method of the second exemplary embodiment is applied, the first database includes the Negotiation Flag indicating whether the node is responsible for negotiating for the MBSFN Indicator or not, and if it is responsible for that, also includes a list of Node Bs 500, with which it negotiates.

In the present exemplary embodiment, Node B 500-1 is responsible for negotiating for the MBSFN Indicator. Accordingly, the Negotiation Flag is set to "1" indicating "enabled" in the first database stored in Node B 500-1, and the list of Node Bs 500, with which the node negotiates, includes Node Bs 500-2 and 500-3, to which the same MBMS data is to be transmitted, as shown in FIG. 12.

As shown in FIG. 6, the second database includes the MBSFN-Indicator and a combination of the set values for the radio resource and the set value for transmission timing associated with the MBSFN-Indicator in cell 600.

If the Decision Flag or Negotiation Flag is set to "enabled", control unit 503 determines the MBSFN-Indicator when the MBSFN is used, by itself or by negotiating with the other Node Bs 500. The MBSFN-Indicator determined here is to be instructed to the other Node Bs 500 as described later.

In the present exemplary embodiment, the Decision Flag or Negotiation Flag of Node B 500-1 is enabled. Accordingly, control unit 503 of Node B 500-1 determines the MBSFN-Indicator and the determined MBSFN-Indicator is instructed to the other Node Bs 500-2 and 500-3.

Control unit 503 performs various operations by controlling the entire of its own Node Bs 500. For example, in the present exemplary embodiment, control unit 503 sets the set value for the radio resource that is associated with the MBSFN-Indicator, which was determined in Node B 500-1, to S-CCPCH.

Consequently, the same radio resource is available for the S-CCPCH in all cells 600 under the control of Node Bs 500-1~500-3.

Control unit 503 generates a message to be transmitted to another node. In the present exemplary embodiment, for example, control unit 503 of Node B 500-1 generates a message including the MBSFN-Indicator determined by itself.

Communication unit 504 transmits and receives a message and the MBMS data to and from another node. For example, in the present exemplary embodiment, communication unit 504 transmits the MBMS data at the transmission timing associated with the MBSFN-Indicator determined in Node B 500-1. Communication unit 504 of Node B 500-1, in particular, transmits a message including the MBSFN-Indicator generated by control unit 503 to the other Node Bs 500-2 and 500-3.

Time synchronization is established between Nodes B 500-1~500-3.

This allows all cells 600 under the control of Nodes B 500-1~500-3 to transmit the same MBMS data at the same transmission timing.

Thus, all cells 600 under the control of Nodes B 500-1~500-3 can transmit the same MBMS data using the same frequency and at the same transmission timing, and can thereby form wide-range MBSFN cluster 700 extending over Node B 500-1~500-3.

(3-2) Operation of Third Exemplary Embodiment

The present exemplary embodiment also applies, to Node B 500a, a method similar to that in the first or second exemplary embodiment applied to RNC 400, and therefore descriptions of operation thereof will be omitted.

Thus, the present exemplary embodiment can also form wide-range MBSFN cluster 700 extending over Nodes B 500-1~500-3.

The present invention has been described with reference to the exemplary embodiments so far, but the present invention is not limited to the above described exemplary embodiments. The configuration and details of the present invention can be changed in various ways in a manner understandable to those skilled in the art without departing from the scope of the present invention.

For example, in the aforementioned first to third exemplary embodiments, parameters such as radio resources (frequency, scrambling code, channelisation code, slot format) and transmission timing as MBSFN information are instructed between respective RNCs 400 or Node Bs 500, but when the present invention is applied to an LTE network, other parameters may be instructed instead of these parameters or other parameters may be additionally instructed. When, for example, OFDMA (Orthogonal Frequency Division Multiple Access) is used on a downlink, radio resources can be indicated by one of the following three patterns. Since these patterns are not essential parts of the present invention, detailed descriptions thereof will be omitted.
(Pattern 1)
Subcarrier numbers and symbol numbers for allocating MBMS data are instructed.
(Pattern 2)
MBMS data allocation time and frequency are additionally instructed.
(Pattern 3)
Resource block numbers are instructed.

The method executed by RNC 400 and Node B 500 of the present invention may also be applied to a program to be executed by a computer. Furthermore, the program may also be stored in a storage medium and may also be delivered to the outside via a network.

The present application claims a priority based on Japanese Patent Application No. 2008-281096, filed on Oct. 31, 2008, the disclosure of which is incorporated herein by reference in its entirety.

The invention claimed is:

1. A first base station comprising: at least one hardware processor configured to execute modules comprising:
a receiver configured to receive, from a second base station, in a procedure to exchange configuration data needed for the first base station and the second base station to interoperate over the X2 interface, a message comprising information comprising at least one parameter related to a Multicast Broadcast Single Frequency Network (MBSFN); and
a transmitter configured to transmit, to a User Equipment (UE), Multimedia Broadcast Multicast Service (MBMS) data,
wherein the at least one parameter related to the MBSFN indicates resource for the MBMS data transmission between the first base station and the UE.

2. The first base station according to claim 1,
wherein the transmitter is further configured to transmit the MBMS data to the UE in a first cell, and wherein the at least one parameter related to the MBSFN is used for the MBMS data transmission in the first cell.

3. The first base station according to claim 1,
wherein the resource is related to a timing for transmitting the MBMS data.

4. A method for communicating data in a mobile communication system, the method comprising:
receiving, by a first base station, from a second base station, in a procedure to exchange configuration data needed for the first base station and the second base station to interoperate over the X2 interface, a message comprising information comprising at least one parameter related to a Multicast Broadcast Single Frequency Network (MBSFN); and
transmitting, by the first base station to a User Equipment (UE), Multimedia Broadcast Multicast Service (MBMS) data,
wherein the at least one parameter related to the MBSFN indicates resource for the MBMS data transmission between the first base station and the UE.

5. The method according to claim 4,
wherein the transmitting includes transmitting the MBMS data to the UE in a first cell, and wherein the at least one parameter related to the MBSFN is used for the MBMS data transmission in the first cell.

6. The method according to claim 4,
wherein the resource is related to a timing for transmitting the MBMS data.

7. A second base station comprising: at least one hardware processor configured to execute modules comprising:
a transmitter configured to transmit, to a first base station, in a procedure to exchange configuration data needed for the first base station and the second base station to interoperate over the X2 interface, a message comprising information comprising at least one parameter related to a Multicast Broadcast Single Frequency Network (MBSFN);
wherein Multimedia Broadcast Multicast Service (MBMS) data is transmitted by the first base station to a User Equipment (UE), and
the at least one parameter related to the MBSFN indicates resource for the MBMS data transmission between the first base station and the UE.

8. The second base station according to claim 7,
wherein the transmitting includes transmitting the MBMS data to the UE in a first cell, and wherein the at least one parameter related to the MBSFN is used for the MBMS data transmission in the first cell.

9. The second base station according to claim 7,
wherein the resource is related to a timing for transmitting the MBMS data.

* * * * *